(12) United States Patent
Narayanam et al.

(10) Patent No.: US 12,367,525 B2
(45) Date of Patent: Jul. 22, 2025

(54) METHOD FOR DIGITALLY SECURING AN ASSET

(71) Applicant: International Business Machines Corporation, Armonk, NY (US)

(72) Inventors: Krishnasuri Narayanam, Bangalore (IN); Venkatraman Ramakrishna, Bangalore (IN); Dhinakaran Vinayagamurthy, Erode (IN); Sandeep Nishad, Bangalore (IN); Vinayaka Pandit, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 18/146,479

(22) Filed: Dec. 27, 2022

(65) Prior Publication Data
US 2024/0212040 A1    Jun. 27, 2024

(51) Int. Cl.
G06Q 40/03    (2023.01)
G06Q 20/40    (2012.01)

(52) U.S. Cl.
CPC ........... G06Q 40/03 (2023.01); G06Q 20/401 (2013.01); *G06Q 2220/00* (2013.01)

(58) Field of Classification Search
CPC .................. G06Q 40/03; G06Q 20/401; G06Q 2220/00
See application file for complete search history.

(56) References Cited

U.S. PATENT DOCUMENTS

| | | | |
|---|---|---|---|
| 10,373,158 B1* | 8/2019 | James | G06Q 40/04 |
| 11,354,734 B2* | 6/2022 | Gleizer | H04L 9/50 |
| 11,544,782 B2* | 1/2023 | Cella | G06Q 40/03 |
| 12,056,766 B2* | 8/2024 | Ingargiola | G06F 16/2379 |
| 2016/0371771 A1* | 12/2016 | Serrano | H04L 67/12 |
| 2018/0075421 A1* | 3/2018 | Serrano | H04L 63/061 |
| 2018/0218176 A1* | 8/2018 | Voorhees | G06Q 20/02 |

(Continued)

OTHER PUBLICATIONS

Black et al., Atomic Loans: Cryptocurrency Debt Instruments, Jun. 16, 2019, arXiv, pp. 1-13 (Year: 2019).*

(Continued)

*Primary Examiner* — John W Hayes
*Assistant Examiner* — Yingying Zhou
(74) *Attorney, Agent, or Firm* — CHIP LAW GROUP

(57) ABSTRACT

A computer-implemented method for automatically and digitally securing an asset is disclosed. The computer-implemented method includes hashing a secret preimage to produce a secret hash. The computer-implemented method further includes locking a digital collateral asset with the secret hash for a first predetermined period of time. The computer-implemented method further includes locking a digital loan asset with the secret hash for a second predetermined period of time, wherein the second predetermined period of time is less than the first predetermined period of time. The computer-implemented method further pledging a digital loan repayment up to the amount of time of the first predetermined period of time plus the second predetermined period of time. The computer-implemented method further includes responsive to receiving a pledge for the digital loan repayment, automatically unlocking the digital collateral asset for a borrower of the digital loan asset.

20 Claims, 13 Drawing Sheets

(56) References Cited

U.S. PATENT DOCUMENTS

| | | | | |
|---|---|---|---|---|
| 2018/0365764 A1* | 12/2018 | Nelson | ............... | H04L 9/0637 |
| 2019/0114706 A1* | 4/2019 | Bell | ............... | G06Q 40/03 |
| 2019/0164221 A1* | 5/2019 | Hill | ............... | G06Q 20/405 |
| 2020/0327609 A1* | 10/2020 | Dubrofsky | ............... | G06Q 40/06 |
| 2020/0387968 A1* | 12/2020 | Cella | ............... | G16Y 10/50 |
| 2021/0042823 A1* | 2/2021 | McClelland | ............... | G06Q 40/04 |
| 2021/0065293 A1* | 3/2021 | Sigler | ............... | G06Q 20/24 |
| 2021/0082044 A1* | 3/2021 | Sliwka | ............... | H04L 9/3255 |
| 2021/0311934 A1* | 10/2021 | Fang | ............... | H04L 9/3247 |
| 2022/0058732 A1* | 2/2022 | Reses | ............... | G06Q 20/065 |
| 2022/0358584 A1* | 11/2022 | Sliwka | ............... | G06Q 20/3678 |
| 2022/0366491 A1* | 11/2022 | Hill | ............... | G06Q 40/03 |

OTHER PUBLICATIONS

Maurice Herlihy, Atomic Cross-Chain Swaps, May 18, 2018, arXiv (Year: 2018).*
Poon et al., The Bitcoin Lightning Network: Scalable Off-Chain Instant Payments, Jan. 14, 2016; (Year: 2016).*
"Blits: DeFi Super App and Cross-chain Loans", Harmony blogspot, Oct. 7, 2020, 8 pages.
"DvP in Financial Markets", Weaver, downloaded from the Internet on Jun. 2, 2022, 3 pages, <https://labs.hyperledger.org/weaver-dlt-interoperability/docs/external/user-stories/financial-markets/>.
"Interoperability Modes", Weaver, downloaded from the Internet on Jun. 2, 2022, 3 pages, <https://labs.hyperledger.org/weaver-dlt-interoperability/docs/external/interoperability-modes/>.
"The Cross-chain Loans Mainnet Beta is Live!", Blits Lab, Feb. 6, 2021, 8 pages.
Black, et al., "Atomic Loans: Cryptocurrency Debt Instruments", arXiv:1901.05117v1 [cs.CR] Jan. 16, 2019, 13 pages.

* cited by examiner

690

Block$_i$

Header 672$_i$
- Hash Value of Previous Block
- Reference Information

File(s) (and Metadata) 674$_i$

| Data 1 | REF 1 | Metadata 1 |
| Data 2 | REF 2 | Metadata 2 |
| . | . | . |
| . | . | . |
| . | . | . |
| Data N | REF N | Metadata N |

Value 676$_i$ (based on one or more of)

- New Hash Value of File
- New Storage Location of File
- New Metadata Assigned to File
- Transfer Access/Control to New Blockchain Participant
- New/Existing/Change of Ownership of the File

FIG. 6D

METHOD FOR DIGITALLY SECURING AN ASSET

BACKGROUND

The present invention relates generally to the field of asset security, and more particularly to, digitally securing an asset in a distributed ledger.

A collateral asset is any asset a borrower uses to secure a loan from a lender. Meaning, if a borrower faults on paying back the loan to the lender, the lender can secure the collateral asset as a form of repayment. Typically, repayment of a loan includes the loan amount plus interest over a set amount of time.

A distributed ledger, such as Blockchain, is a shared, immutable ledger that facilitates the process of recording transactions and tracking assets in a business network. An asset can be tangible (a house, car, cash, land) or intangible (intellectual property, patents, copyrights, branding). A non-fungible token (NFT) is a record on a blockchain which is associated with a particular digital or physical asset. The ownership of an NFT is recorded in the blockchain, and can be transferred by the owner, allowing NFTs to be sold and traded. A smart contact is a computer program or a transaction protocol that is intended to automatically execute, control or document legally relevant events and actions according to the terms of a contract or an agreement. For example, when an NFT is transferred from one cryptocurrency wallet to another, the smart contract attached to the NFT is executed. A cryptocurrency wallet is a device, physical medium, program or a service which stores digital assets for cryptocurrency transactions. Locking a digital asset ensures the asset cannot be traded, sold, or transferred to another cryptocurrency wallet or platform until the digital asset is unlocked.

Proof of Work (POW) uses a competitive validation method to confirm transactions and add new blocks to the blockchain. Proof of Work is a decentralized consensus mechanism that requires members of a network to expend effort solving an arbitrary mathematical puzzle to prevent anybody from gaming the system. Proof of work is used widely in cryptocurrency mining, for validating transactions and mining new tokens. Tokens are crypto assets that do not have their own blockchain but live on another blockchain and benefit from its technology. For example, if information about a ledger must be supplied to a party that is not on the network of peers that maintains the shared ledger. Proof of work needs to be supplies to convince a party of the authenticity of the information. The receiver of the information must be able to validate the proof against the supplied information without themselves joining the network. In an open network, where the chain of blocks can be obtained by anyone who seeks them, proof-of work or proof-of-stake can serve to fix this problem.

A pledge of interest is a process by which holders of a particular token can receive a reward. Pledges of interest originate from a proof of interest mechanism used in distributed blockchain networks, where blockchain miners can mine or validate block transactions against their token holdings. Pledging is the commitment recorded on a ledger to transfer ownership of an asset to a different party, and possibly move that asset to a different ledger altogether in the process. Pledging can only be made by the current legitimate owner of the asset. The act of pledging must be accompanied by proof showing that one is entitled to make a pledge. The receiver (on the same or on a different ledger) can claim this asset within a specified time period before the pledge expires by proving its credentials to the network (e.g., the smart contract governing the asset).

SUMMARY

According to one embodiment of the present invention, a computer-implemented method for automatically and digitally securing an asset is disclosed. The computer-implemented method includes hashing a secret preimage to produce a secret hash. The computer-implemented method further includes locking a digital collateral asset with the secret hash for a first predetermined period of time. The computer-implemented method further includes locking a digital loan asset with the secret hash for a second predetermined period of time, wherein the second predetermined period of time is less than the first predetermined period of time. The computer-implemented method further pledging a digital loan repayment up to the amount of time of the first predetermined period of time plus the second predetermined period of time. The computer-implemented method further includes responsive to receiving a pledge for the digital loan repayment, automatically unlocking the digital collateral asset for a borrower of the digital loan asset.

According to another embodiment of the present invention, a computer program product for automatically and digitally securing an asset is disclosed. The computer program product includes one or more computer readable storage media and program instructions stored on the one or more computer readable storage media. The program instructions include instructions to hash a secret preimage to produce a secret hash. The program instructions further include instructions to lock a digital collateral asset with the secret hash for a first predetermined period of time. The program instructions further include instructions to lock a digital loan asset with the secret hash for a second predetermined period of time, wherein the second predetermined period of time is less than the first predetermined period of time. The program instructions further include instructions to pledge a digital loan repayment up to the amount of time of the first predetermined period of time plus the second predetermined period of time. The program instructions further include instructions to responsive to receiving a pledge for the digital loan repayment, automatically unlock the digital collateral asset for a borrower of the digital loan asset.

According to another embodiment of the present invention, a computer system for automatically and digitally securing an asset is disclosed. The computer system includes one or more computer processors, one or more computer readable storage media, and computer program instructions, the computer program instructions being stored on the one or more computer readable storage media for execution by the one or more computer processors. The program instructions include instructions to hash a secret preimage to produce a secret hash. The program instructions further include instructions to lock a digital collateral asset with the secret hash for a first predetermined period of time. The program instructions further include instructions to lock a digital loan asset with the secret hash for a second predetermined period of time, wherein the second predetermined period of time is less than the first predetermined period of time. The program instructions further include instructions to pledge a digital loan repayment up to the amount of time of the first predetermined period of time plus the second predetermined period of time. The program instructions further include instructions to responsive to receiving a pledge for the digital loan repayment, automatically unlock the digital collateral asset for a borrower of the digital loan asset.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 6D illustrates a block which may represent the structure of blocks in the blockchain, in accordance with at least one embodiment of the present disclosure.

Figure 1:
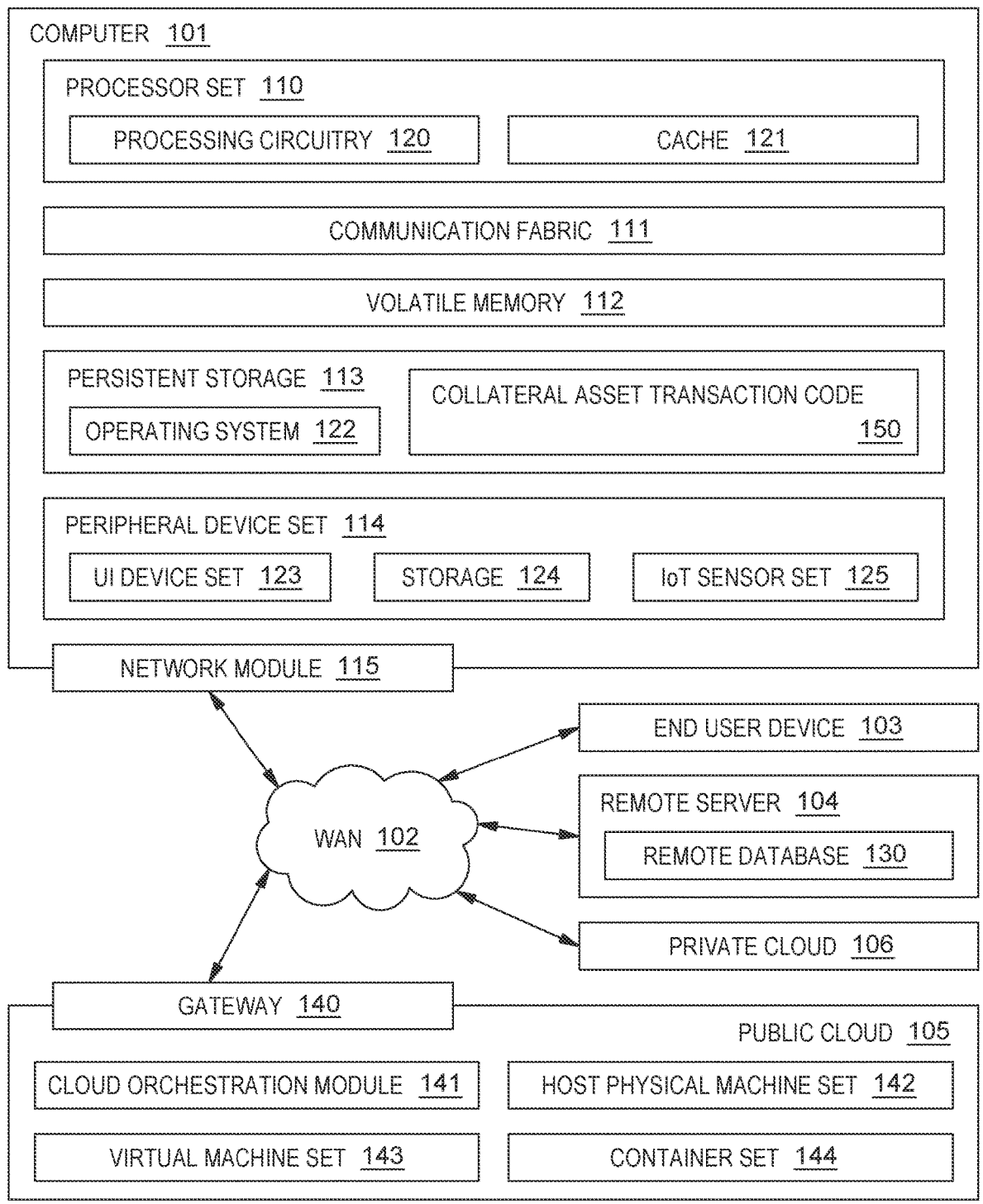
FIG. 1 is a functional block diagram of computing environment, generally designated 100, suitable for the execution of at least some of the computer code involved in performing the inventive methods, such as collateral asset transaction code included in block 150, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of asset security, and more particularly to, digitally securing an asset in a distributed ledger.

When a borrower receives a loan from a lender, a lender usually requires a collateral asset to attach to the loan to ensure the lender will receive repayment of the loan. In the event the borrower does not pay back and defaults on the loan, the loaner can keep the collateral asset. If the borrower satisfies the loan, the borrow can collect the collateral asset back. However, there is a need to ensure the collateral asset is not used or spent by the lender during the loan period in order to ensure that if the borrower pays back the loan, the borrow can recollect the collateral asset.

Embodiments of the present invention ensure that the borrower is guaranteed to recover the digital collateral asset immediately upon repayment of the loan with interest. Embodiments of the present invention prevent the digital collateral asset from being spent or used by the lender until the loan period elapses, and the borrower has not repaid the loan amount with interest within the agreed loan period. Embodiments of the present invention lock the digital collateral asset with a hash generated from the digital collateral asset in order to ensure the digital collateral asset is not used by the lender until the loan period has lapsed.

Embodiments of the present invention recognize that a borrower may repay a loan back early to a lender before the loan period expires. Embodiments of the present invention automatically unlock the digital collateral asset for the borrower to recover upon repayment or satisfaction of the loan. Embodiments of the present invention automatically unlock the digital collateral asset for the borrower upon repayment of the loan. Meaning, if a borrower repays the loan back early, the borrower gains back access to their digital collateral asset earlier and does not need to wait for the loan period to expire.

Embodiments of the present invention ensure the borrower receives the loan amount at the beginning of the loan tenure. Embodiments of the present invention distribute the loan amount to the borrower at the beginning of the loan tenure. Embodiments of the present invention allow the borrower to recover the digital collateral asset anytime within the loan tenure by paying the loan amount or satisfying the loan to the lender. In an embodiment, the amount to satisfy the loan is more than the amount borrowed. For example, the loan amount has an interest and the amount to satisfy the loan is the interest over time of the loan amount borrowed. If the borrower does not satisfy the loan before the loan tenure time expires, embodiments of the present invention unlock the digital collateral asset for the lender.

Embodiments of the present invention recognize the need to transfer loan amounts and lock a collateral asset in a singular transaction. Embodiments of the present invention distribute loan amounts and lock a collateral asset in a singular transaction. Further, embodiments of the present invention recognize the need to unlock a collateral asset when loan repayment is received in a singular transaction.

Providing loans against digital collateral assets is a common financial transaction, which can be made more efficient using blockchain and smart contracts. Embodiments of the present invention recognize the need to solve the problem of communicating between shared ledgers for authenticity proof, automatically swapping digital assets, and transferring digital assets from one ledger to another all while not compromising the safety an authenticity of the transferred digital assets and information. For example, using one or more ledgers allows a loan to issue in one currency and repayment of the loan in another currency. Embodiments of the present invention solve the problem of utilizing multiple ledgers by sending details of the pledge or proofs and claim on a digital asset on a first ledger in a first network. Embodiments of the present invention recognize the need for utilizing different ledgers. Embodiments of the present invention recognize sensitive financial assets are typically maintained on private networks. Embodiments of the present invention utilize pledges and proofs to ensure the authenticity of the work on different ledgers. In an embodiment a pledge is secured data from one blockchain to another. In an embodiment, the proof is proof of work in a blockchain which conveys the off ledger proof is authentic.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram of a computing environment, generally designated 100, suitable for the execution of at least some of the computer code involved in performing the inventive methods, such as new collateral asset transaction code included in block 150, in accordance with at least one embodiment of the present invention. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
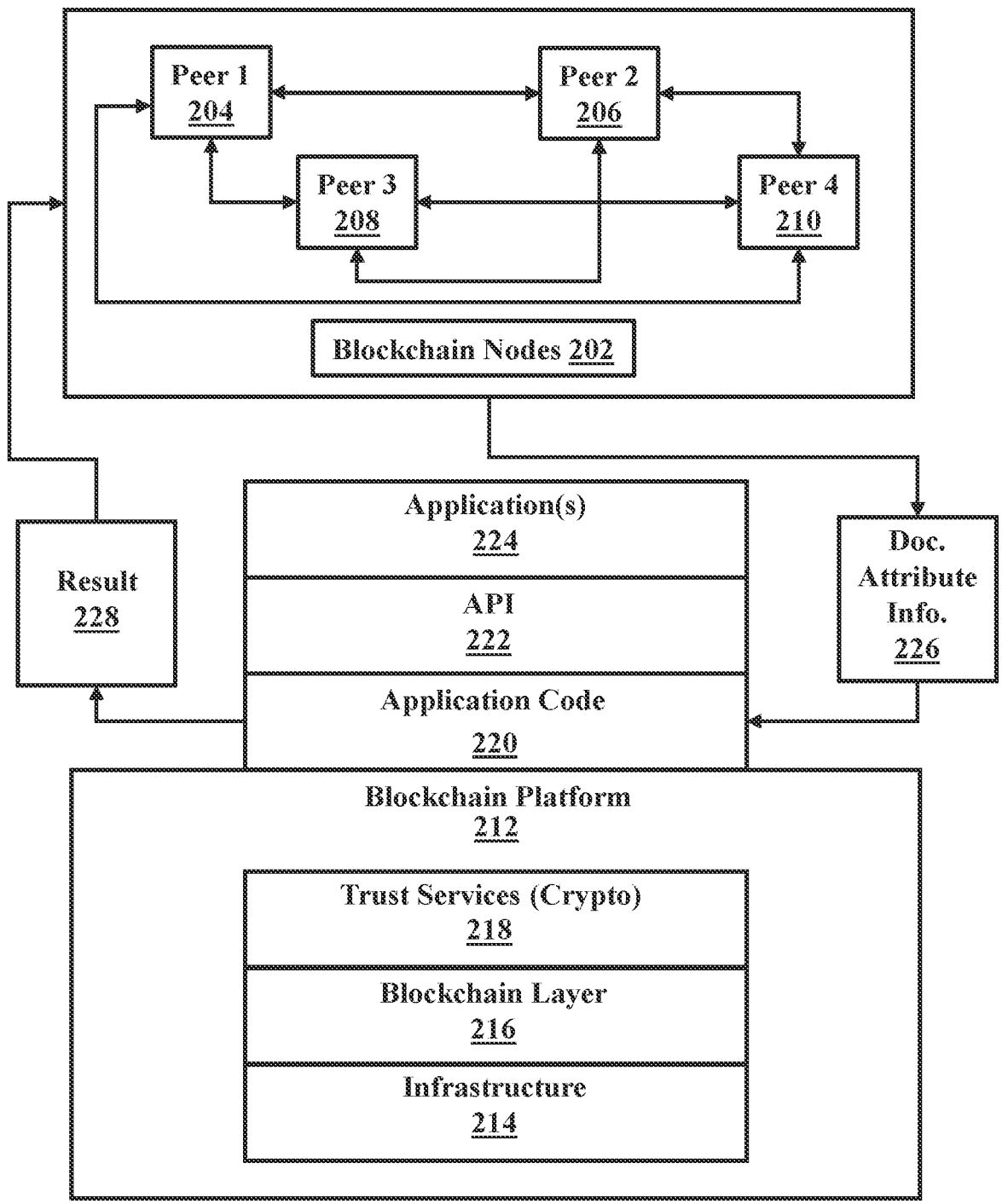
FIG. 2A illustrates an example blockchain architecture configuration, according to at least one embodiment of the present invention.

FIG. 2A illustrates an example blockchain architecture configuration, according to at least one embodiment of the present invention. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute the generation of storage spaces, the reserving of storage spaces, updates to current transaction agreements, etc. The smart contracts can themselves be used to identify rules associated with authorization and access requirements and usage of the ledger. For example, the document attribute(s) information 226 may be processed by one or more processing entities (e.g., virtual machines) included in the blockchain layer 216. The result 228 may include a plurality of linked shared documents (e.g., with each linked shared document recording the issuance of a smart contract, etc.). The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus establishing a new smart contract between a user and a licensor).

Figure 2B:
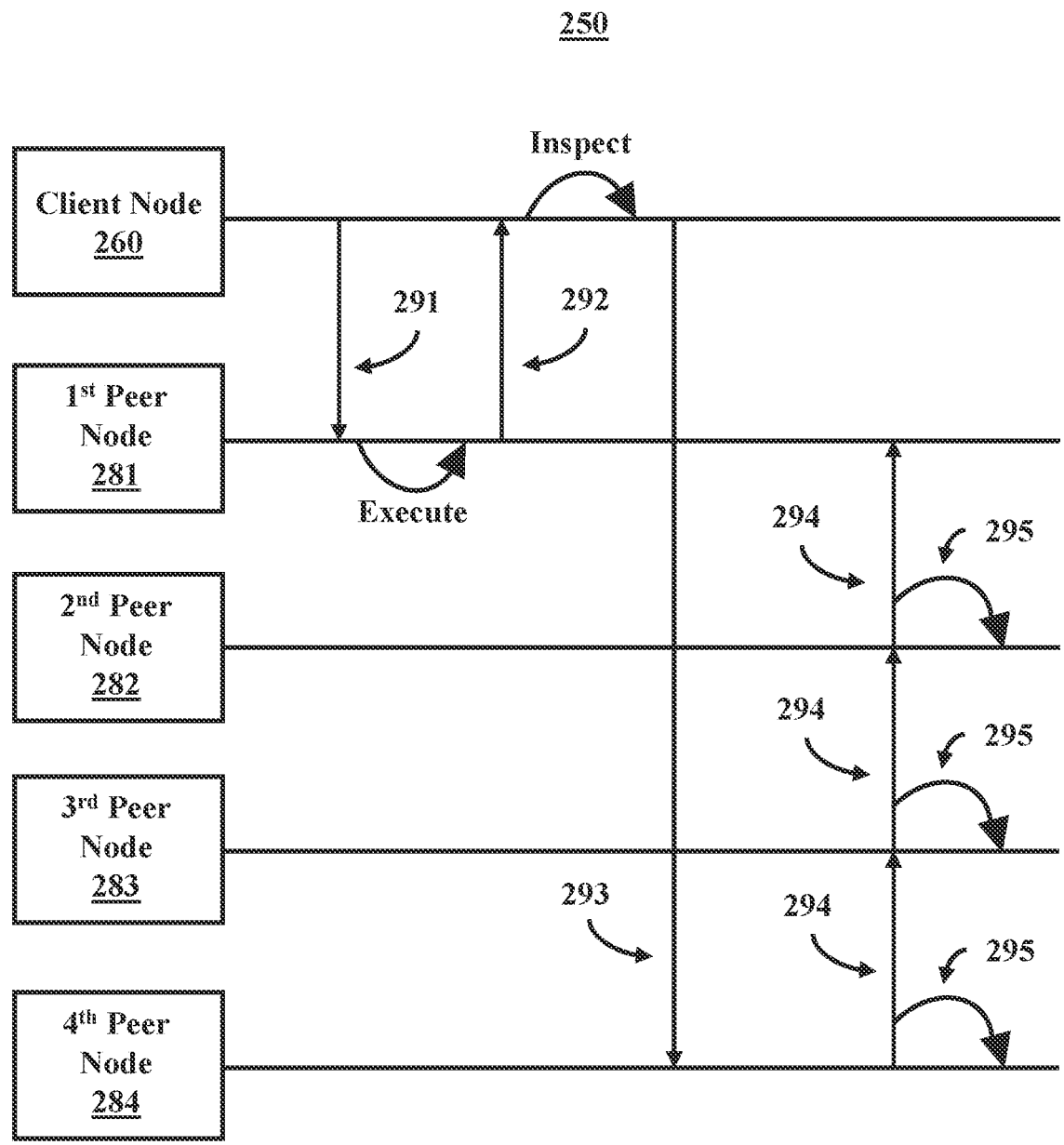
FIG. 2B illustrates a blockchain transactional flow, generally designated 250, in accordance with at least one embodiment of the present invention.

FIG. 2B illustrates an example of a blockchain transactional flow 250 between nodes of the blockchain according to at least one embodiment of the present invention. Referring to FIG. 2B, the transaction flow may include a transaction proposal 291 sent by an application client node 260 to an endorsing peer node 281 (e.g., in some embodiments, the transaction proposal 291 may be sent for determining licensing terms, ownership, or authentication of a digital asset). The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the transaction terms, ownership, or other digital asset data to ensure correct allotment and distribution of assets for transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (e.g., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (e.g., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transaction 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
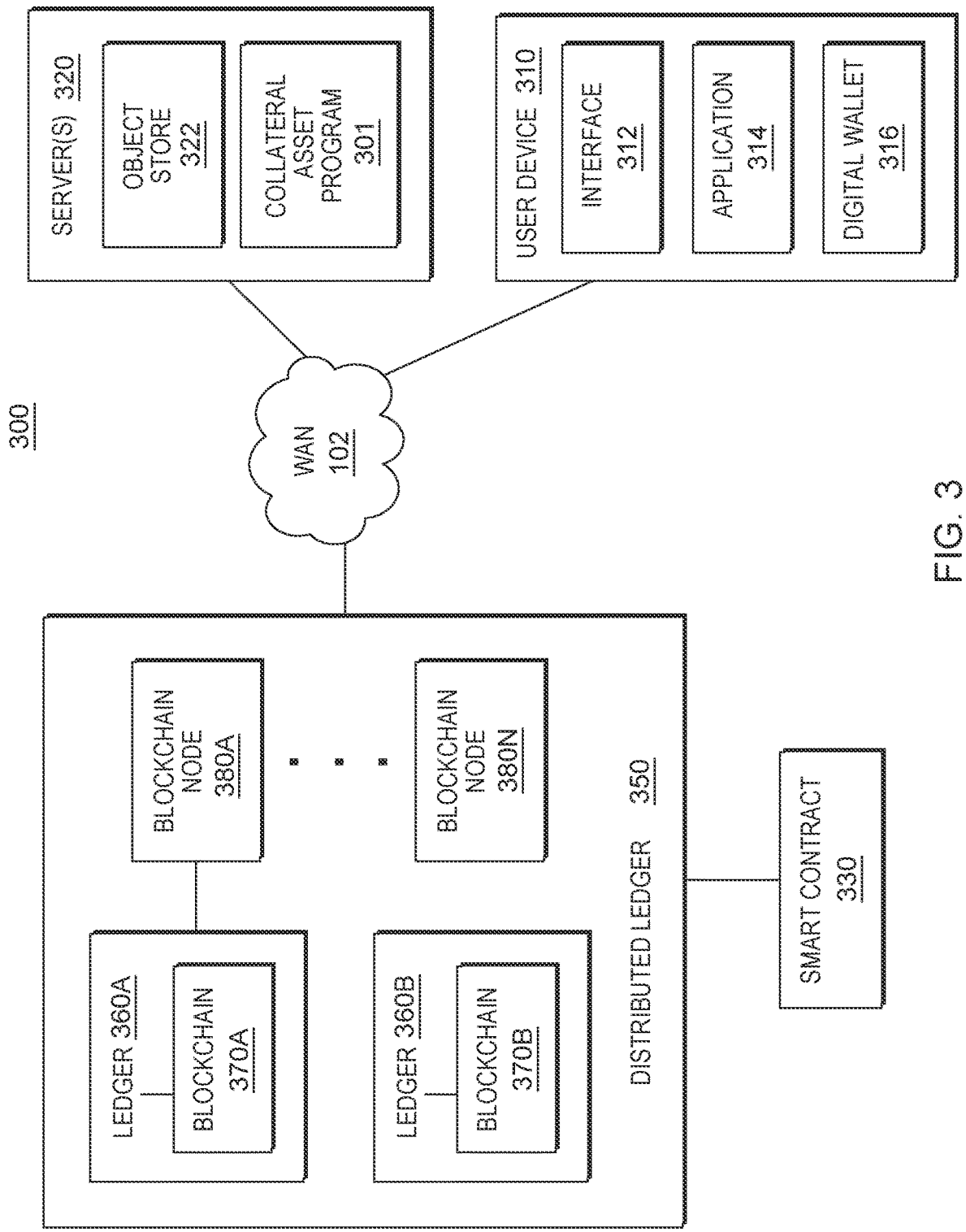
FIG. 3 is a functional block diagram of a collateral asset system, generally designated 300, suitable for operation of a collateral asset program 301, in accordance with at least one embodiment of the present invention.

FIG. 3 is a functional block diagram of a collateral asset system, generally designated 300, suitable for operation of a collateral asset program 301, in accordance with at least one embodiment of the present invention. Collateral asset system 300 may be implemented in a computing environment, such as computing environment 100, as described with reference to FIG. 1. FIG. 3 provides an illustration of only one implementation and does not imply any limitations with regard to the environments in which different embodiments may be implemented. Many modifications to the depicted environment may be made by those skilled in the art without departing from the scope of the present invention as recited by the claims.

Collateral asset system 300 includes user device 310, server 320, smart contract 330, distrusted ledger 350, ledger 360A and 360B, blockchain 370A and 370B, blockchain nodes 380A-380N, interconnected over network, such as WAN 102. In general, user device 310 can represent any programmable electronic device or combination of programmable electronic devices capable of executing machine readable program instructions and communicating with server 320 and other devices (not depicted) via a network, such as WAN 102. In an embodiment, user device 310 is an end user device, such as EUD 103 depicted in FIG. 1, and can be a mobile device, laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art.

User device 310 further includes user interface 312, application 314, and digital wallet 316. User interface 312 is a program that provides an interface between a user of an end user device, such as user device 310, and a plurality of applications that reside on the device (e.g., application 314). A user interface, such as user interface 312, refers to the information (such as graphic, text, and sound) that a program presents to a user, and the control sequences the user employs to control the program. A variety of types of user interfaces exist. In one embodiment, user interface 312 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 312 is a script or application programming interface (API).

Application 314 can be representative of one or more applications (e.g., an application suite) that operate on user device 310. In an embodiment, application 314 is representative of one or more applications (e.g., asset holding applications, asset marketplace applications, and asset authentication applications) located on user device 310. For example, a user accesses an asset holding software via application 314 to buy a digital asset. In another example, a user uploads a digital asset online via application 314. In various example embodiments, application 314 can be an application that a user of user device 310 utilizes to access an asset marketplace website and post for sale, trade, offer, or buy digital assets. In an embodiment, application 314 can be a client-side application associated with a server-side application running on server 320 (e.g., a client-side application associated with digital asset ownership validation program 301). In an embodiment, application 314 can operate to perform processing steps of collateral asset program 301 (i.e., application 314 can be representative of collateral asset program 301 operating on user device 310).

Wallet 316 is a digital or cryptocurrency wallet. In an embodiment, wallet 316 includes information associated with one or more public and private keys corresponding to a digital asset. In an embodiment, wallet 316 includes information on one or more digital assets. In an embodiment, a digital asset includes an NFT, cryptocurrency, funds, or other digital assets. In an embodiment, wallet 316 is a hardware cryptocurrency wallet.

Server 320 is configured to provide resources to various computing devices, such as user device 310. In general, server 320 represents any programmable electronic device or combination of programmable electronic devices capable of executing machine readable program instructions and communicating with each other, as well as with user device 310, smart contract 330, and other computing devices (not shown) within a network, such as WAN 102. In an embodiment, server 320 is a standalone device, such as computer 101 depicted in FIG. 1, that is capable of running a program and accessing a network or querying a database. In an embodiment, server 320 can be a management server, a web server, an application server, a mobile device, or any other electronic device or computing system capable of receiving, sending, and processing data. In an embodiment, server 320 represents a server computing system utilizing multiple computers as a server system. In an embodiment, server 320 represents a computing system utilizing clustered computers and components (e.g., database server computer, application server computer, web server computer, webmail server computer, media server computer, etc.) that act as a single pool of seamless resources. Server 320 further includes collateral asset program 301 and object store 322. Collateral asset program 301 may be formed, at least in part, from collateral asset transaction code of block 150 as depicted and described with reference to FIG. 1.

In an embodiment, object store 322 stores information on digital assets. In an embodiment, object store 322 is an object store service running on one or more servers.

In an embodiment, server 320 includes collateral asset program 301. In an embodiment, collateral asset program 301 may be configured to access various data sources, such as the users digital wallet that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, collateral asset program enables the authorized and secure processing of personal data. In an embodiment, collateral asset program 301 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, collateral asset program 301 provides information regarding personal data and the nature (e.g., type, scope, purpose, duration, etc.) of the processing. In an embodiment, collateral asset program 301 provides a user with copies of stored personal data. In an embodiment, collateral asset program 301 allows for the correction or completion of incorrect or incomplete personal data. In an embodiment, collateral asset program 301 allows for the immediate deletion of personal data.

Smart contract 330 includes information on one or more smart contracts attached or associated with a digital asset. In an embodiment, smart contract 330 includes executable code which is registered, stored, and/or replicated with a blockchain. A transaction is an execution of the smart contract code which can be performed in response to conditions associated with the smart contract being satisfied, such as transferring an NFT from one cryptocurrency wallet to another. In an embodiment, smart contract 330 and a registry can be used interchangeably.

In an embodiment, smart contract 330 is written to the blockchain in the form of key-value pairs. Furthermore, the smart contract code can be structured to read the values stored in a blockchain and use them in application operations. The smart contract code can be structured to write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

In an embodiment, smart contract 330 is executed on blockchain nodes 380A-380N. In an embodiment, smart contract 330 determines the private key associated with the digital asset or wallet.

Distributed ledger 350 comprises one or more independent computers or nodes, such as ledger 360A and 360B and blockchain nodes 380A-380N, used to share and synchronize transactions in their respective electronic ledgers. In an embodiment, distributed ledger 350 is stored in a local blockchain, such as blockchain 370A and 370B.

Ledger 360A and 360B include one or more ledgers capable of executing a blockchain, such as blockchain 370A and 370B.

Blockchain 370 may be configured to use one or more smart contracts, such as smart contract 330, that manage transactions for multiple participating nodes. In some embodiments, a neural network and/or any form of machine-learning may be utilized by the cloud service providers to analyze the smart contracts and/or transaction requests to determine transaction terms or authenticating information. In an embodiment, blockchain 370A and 370B may store data to be shared among the nodes, such as blockchain nodes 380. In an embodiment, blockchain 370A and 370B may be represented by blockchain architecture configuration 200, as described with reference to FIG. 2A.

Blockchain nodes 380A-380N includes one or more nodes. In an embodiment, blockchain nodes 380A-380N may be represented by blockchain nodes 202, as previously described with reference to FIG. 2A.

In an embodiment, collateral asset program 301 receives a request that a user is borrowing a loan and is using a collateral asset to secure the loan. For example, collateral asset program 301 receives a request from user X who to borrow a loan against the bond M it owns from user Y, using the bond as collateral. In an embodiment, collateral asset program 301 determines the loan tenure period. In an embodiment, the loan tenure period is the amount of time the borrower has to repay back or satisfy the loan. In an embodiment, in order to satisfy the loan, the borrow must pay back the original loan amount and interest. In an embodiment, collateral asset program 301 determines the loan tenure period is L.

In an embodiment, collateral asset program 301 hashes secret preimage (s). In an embodiment, hashing secret preimage (s) produces H=Hash(s). In an embodiment, the secret preimage is a string or a random string. In an embodiment, collateral asset program 301 hashes the string to produce the hash of (s). In an embodiment, collateral asset program 301 locks the collateral asset with the hash of the secret preimage (s) for the loan tenure period. In an embodiment, collateral asset program 301 locks the loan amount with the hash of (s) for a period of time. In an embodiment, the loan amount is a monetary amount, a loan asset, or another form of an asset. In an embodiment, the period of time collateral asset program 301 locks the loan amount with the hash of (s) is less than the loan period time. In an embodiment the time period the loan amount is locked for is T/2.

In an embodiment, collateral asset program 301 claims the loan amount by revealing the secret preimage before the time period the loan amount is locked for expires. For example, collateral asset program 301 claims the loan amount by revealing the preimage secret before T/2 expires. In an embodiment, collateral asset program 301 distributes the loan amount to the borrower.

In an embodiment, collateral asset program 301 receives an indication that repayment of the loan has been satisfied or determines that repayment of the loan has been satisfied. For example, collateral asset program 301 receives the loan amount and interest from the borrower. In another example, collateral asset program 301 receives proof of work or a pledge of repayment. In another example, collateral asset program 301 determines the borrower satisfied the loan amount and any required interest. In an embodiment, collateral asset program 301 claims the collateral asset by supplying a pledge of the satisfied loan before the loan time expires. In an embodiment, collateral asset program 301 transfers the pledge from a first network to a second network. For example, collateral asset program 301 transfers the pledge on the loan amount and interest from a first network to a second network in order to claim the collateral asset back for the borrower. In an embodiment, collateral asset program 301 receives proof (p) the loan from the borrower to reclaim the collateral asset, borrower. In an embodiment, collateral asset program 301 receives proof (p) from a different network or ledger than the network or ledger with the collateral asset. In an embodiment, collateral asset program 301 fetches the pledge on R from a second network or ledger using any known in the field cross-network data sharing protocol that enables one network to query the state of another's ledger with proof of that state's authenticity, such as interop-query.

In an embodiment, collateral asset program 301 extends the amount of time the lender has to access the repayment loan amount. For example, if collateral asset program 301 receives repayment of a loan on the last day of the loan period from the borrower, collateral asset program 301 extends the amount of time the lender is able to access the repayment amount. In an embodiment, collateral asset program 301 automatically unlocks the collateral asset for the borrower when repayment of the loan before the loan period lapses is received from the borrower. In an embodiment, collateral asset program 301 extends the amount of time the lender has to supply the claim on the digital collateral asset by increasing the amount of time of the first predetermined period of time that the collateral asset is locked with the secret hash.

In an embodiment, collateral asset program 301 determines the loan period has lapsed and the loan repayment was not satisfied. In an embodiment, in response to determining the loan period has lapsed and the loan repayment was not satisfied, collateral asset program 301 unlocks the collateral asset for the lender to claim. In an embodiment, in response to determining collateral asset program 301 did not receive pledge of the loan satisfaction before the loan period lapsed, collateral asset program 301 unlocks the collateral asset for the lender to claim.

In an embodiment, collateral asset program 301 receives secret preimages (s) from the borrower and produces a hash (H) of the secret. In an embodiment, collateral asset program 301 locks the collateral with H for the loan period on a bond ledger. In an embodiment, a bond ledger is a ledger that holds a digital representation or record of a physical bond. In an embodiment a bond ledger can be implemented on blockchain technology. In an embodiment, the bond ledger is a smart contract, such as smart contract 330 which executes the terms of a contract.

In an embodiment, collateral asset program 301 locks the loan amount with H for a short duration T/2 on a token ledger. In an embodiment, collateral asset program 301 claims the collateral using secret preimage (s) and pledges the collateral for the loan period on the bond ledger. In an embodiment, secret (s) is available for the loan and token ledger. In an embodiment a token ledger is a lodger implemented on blockchain that holds digital representations of physical tokens. In an embodiment, tokens can include currency equivalents or non-fungible tokens (NFTs). In an embodiment, tokens are crypto assets that does not have their own blockchain but live on another blockchain and benefit from its technology. In an embodiment, the claim and the pledge on the collateral happen atomically. In an embodiment, collateral asset program 301 receives a pledge repayment amount from the borrower. In an embodiment, collateral asset program 301 receives a pledge repayment amount up to the time before the loan period lapses on the token ledger. In an embodiment, collateral asset program 301 claims the collateral on the bond ledger for the borrower by providing the pledge of the repayment amount as the proof of work. For example, the pledge of repayment amount is the proof of work. In an embodiment, the pledge of repayment amount from token ledger is fetched by collateral asset program 301 via cross-chain data sharing protocol. In an embodiment, collateral asset program 301 claims the loan repayment on the token ledger, by supplying claim of the collateral by the borrower. In an embodiment, the claim of the collateral is fetched by collateral asset program 301 via cross-chain data sharing protocol.

In an embodiment, loan repayment can take place on an additional ledger which is different from the ledgers where the collateral asset and loan amount lie, to enable the loan payment and repayment in different currencies. In an embodiment, a tri party agreement (involving the borrower and lender) lets ownership of the collateral asset switch across lenders for liquidity creation without removing the pledge on the collateral by the lender on the bond network. In an embodiment, collateral asset program 301 allows for loan pre-closure by the borrower with an immediate claim of the collateral on bond network. In an embodiment, collateral asset program 301 avoids denial of service attack launched by the lender causing the collateral asset to not be accessible to the borrower on the bond network for the loan period.

Figure 4:
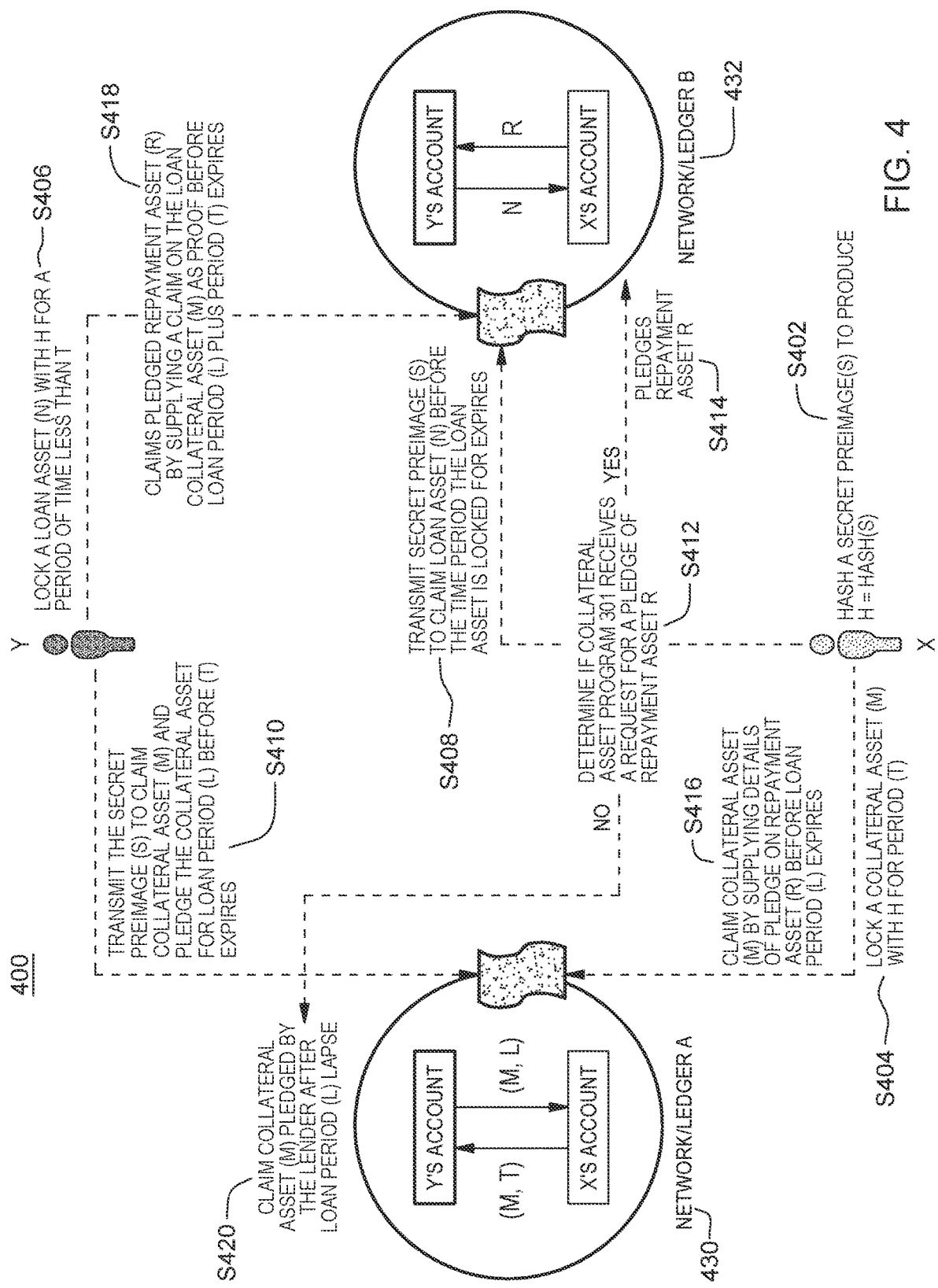
FIG. 4 is a flow chart diagram depicting operational steps for a collateral asset program 301, generally designated 400, in accordance with at least one embodiment of the present invention.

FIG. 4 is a functional block diagram and flow chart diagram depicting operational steps for collateral asset program 301, generally designated 400, in accordance with at least one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims. FIG. 4 depicts two networks/ledgers Network/Ledger A 430 and Network/Ledger B 432. In an embodiment, FIG. 4 includes a third ledger (e.g., Network/Ledger C (not depicted)) or any number of additional ledgers may be contemplated.

At step S402, collateral asset program 301 hashes a secret preimage (s) to produce H=Hash(s). In an embodiment, the secret is a string or a random string. In an embodiment, collateral asset program 301 hashes the string to produce the hash of (s).

At step S404, collateral asset program 301 locks a collateral asset (M) with H for period (T). In an embodiment, period (T) is any amount of time less than a loan period time (L). L is typically in the order of several days to years. And T is small duration (few hours to days) within which either the lender or the borrower need to complete their actions like lock, pledge or claim. In an embodiment, collateral asset program 301 locks the collateral asset with the hash of the secret for the time of the loan period. For example, if the loan period is three months, collateral asset program 301 locks the collateral asset with the hash of the secret for three months. In an embodiment, collateral asset program 301 transfers information of the locked collateral asset (M) with H for period T from the borrower to a first network or first ledger.

At step S406, collateral asset program 301 locks a loan asset (N) with H for a period of time less than T. For example, collateral asset program 301 locks the loan asset for T/2. In an embodiment, collateral asset program 301 transfers information of the locked loan asset (N) with H for a period of time less than T from the lender (Y) to a second network or a second ledger.

At step S408, collateral asset program 301 transmits secret preimage (s) to claim loan asset (N) before the time period the loan asset is locked for expires. For example, collateral asset program 301 claims the loan asset (N) by revealing the secret before T/2 expires. In an embodiment, collateral asset program 301 transfers information of revealed secret (s) to claim loan asset (N) before the time period the loan asset is locked for expires from a second network or a second ledger to the borrower (X).

At step S410, collateral asset program 301 transmits the secret preimage (s) to claim collateral asset (M) and pledges the collateral asset for loan period (L) before period (T) expires. In an embodiment, collateral asset program 301 transfers secret (s) to claim collateral asset (M) and pledges the collateral asset for loan period (L) before period (T) expires from the first network or ledger to the lender.

At decision step S412, collateral asset program 301 determines if collateral asset program 301 receives a request for a pledge of repayment asset R. If, collateral asset program 301 determines collateral asset program 301 receives a request for a pledge of repayment asset R (decision step S412 "YES" branch), collateral asset program 301 proceeds to step S414. If collateral asset program 301 determines collateral asset program 301 does not receives a request for a pledge of repayment asset R (decision step S412 "NO" branch), collateral asset program 301 proceeds to step S420.

At step S414, collateral asset program 301 pledges repayment asset R. In an embodiment, collateral asset program 301 pledges repayment asset (R) up until the time of the loan period (L) plus the period time (T). In an embodiment, collateral asset program 301 transfers information of the pledge of asset (R) from the prospective borrower to a second network or a second ledger.

At step S416, in response to pledging repayment asset R, collateral asset program 301 claims the collateral asset (M) by supplying details of pledge on repayment asset (R) before loan period (L) expires. In an embodiment, collateral asset program 301 fetches the details of pledge on repayment asset R from the second network or ledger via interop-query.

At step S418, collateral asset program 301 claims pledged repayment asset (R) by supplying a claim on the loan collateral asset (M) as proof before loan period (L) plus period (T) expires. In an embodiment, collateral asset program 301 claims the pledged repayment asset (R) by supplying claim on loan collateral asset (M) from the first network or ledger via interop-query. In an embodiment, if the borrower fails to carry out step S412 (and fails to repay the amount) then the pledged collateral asset (M) will be claimed by the lender after the loan period (L) elapses. This is regarded as recovery of loan asset from the borrower by the lender.

At step S420, responsive to collateral asset program 301 determining collateral asset program 301 does not receive a request for a pledge of repayment asset (R), collateral asset program 301 claims collateral asset (M) pledged by the lender after loan period (L) lapse.

Figure 5A:
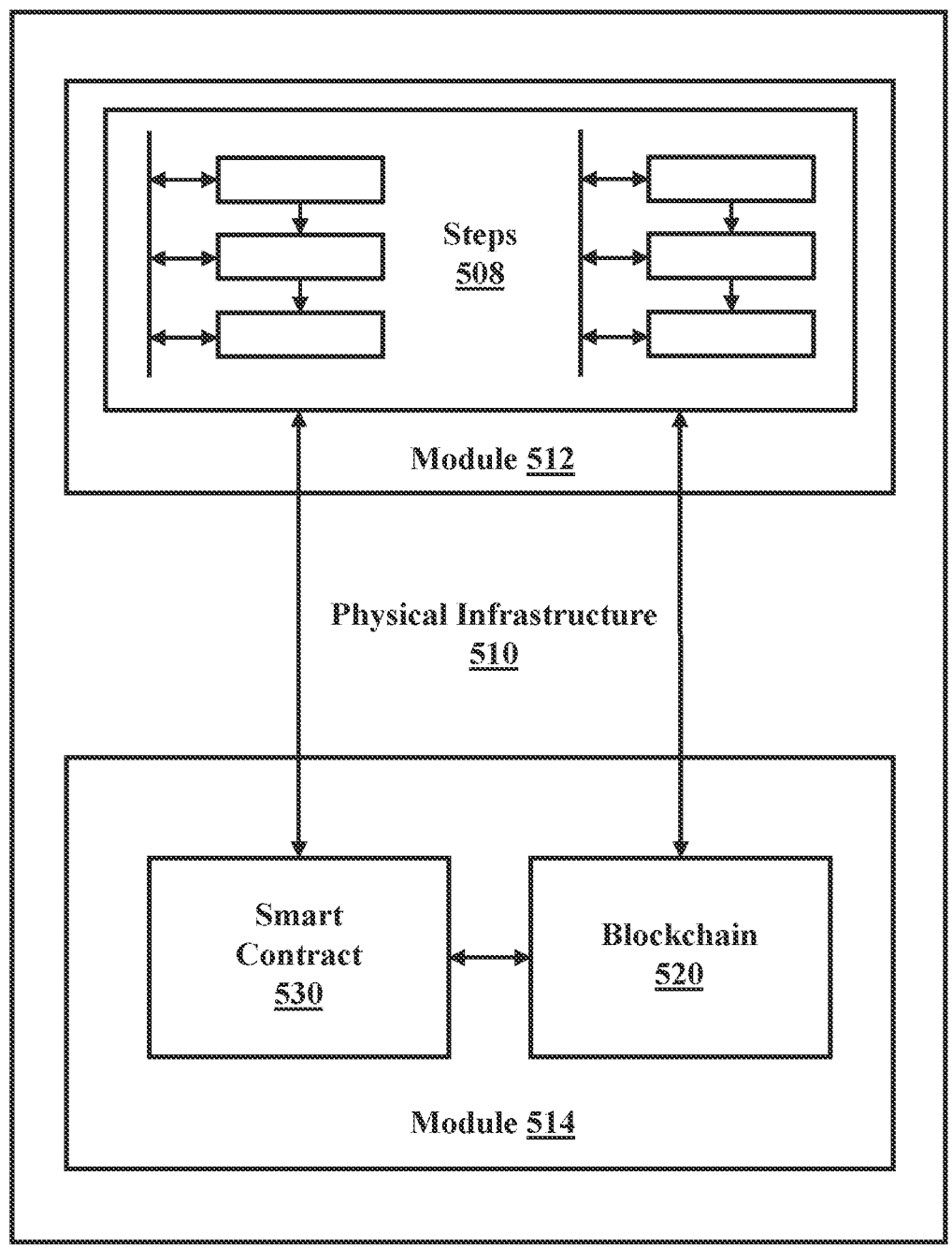
FIG. 5A illustrates an example system configured to perform one or more operations described herein, in accordance with at least one embodiment of the present disclosure.

FIG. 5A illustrates an example system 500 that includes a physical infrastructure 510 configured to perform various operations in accordance with embodiments of the present disclosure. Referring to FIG. 5A, the physical infrastructure 510 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5B:
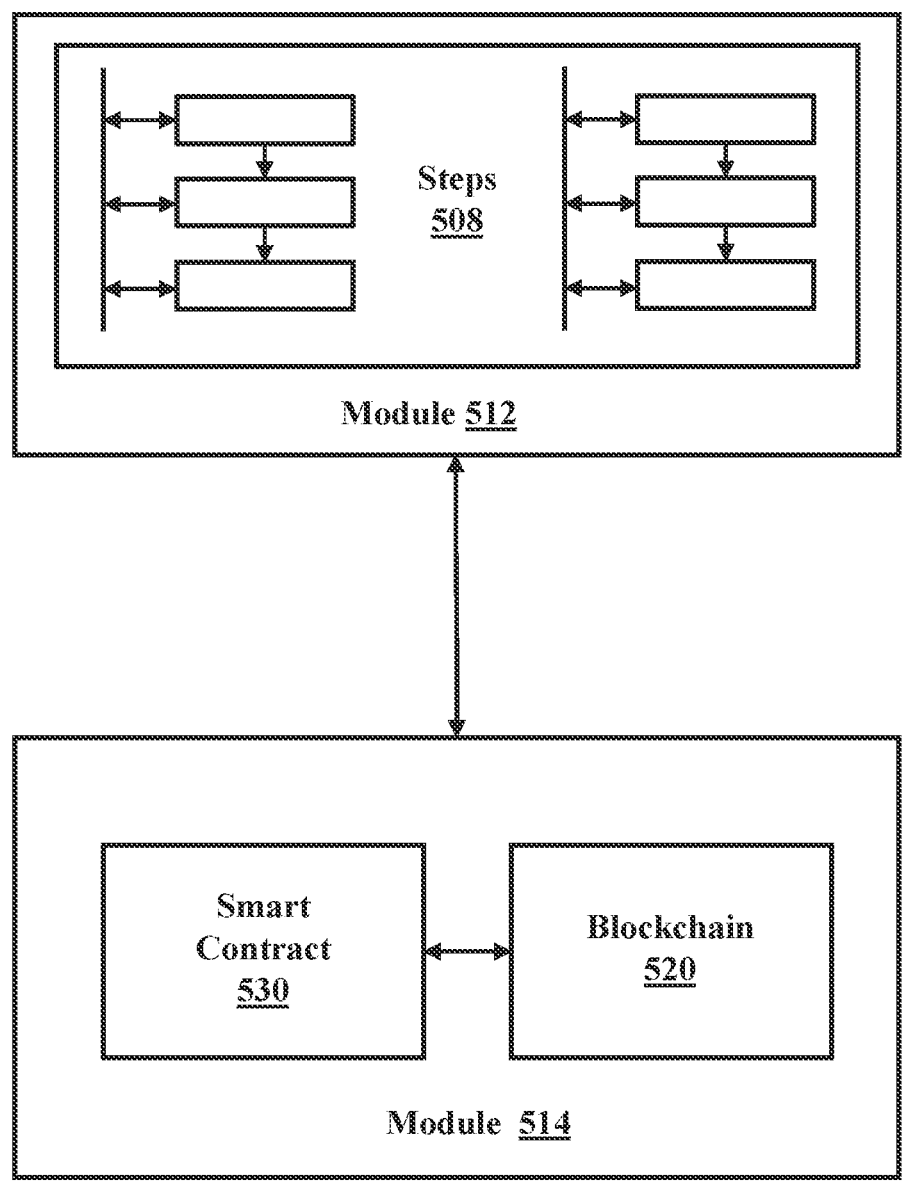
FIG. 5B illustrates another example system configured to perform one or more operations described herein, in accordance with at least one embodiment of the present disclosure.

FIG. 5B illustrates another example system 540 configured to perform various operations in accordance with embodiments of the present disclosure. Referring to FIG. 5B, the system 540 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical module 512 and the module 514 may include one or more computers, servers, processors, memories, and/or wireless communication devices. Further, the module 512 and the module 514 may be a same module.

Figure 5C:
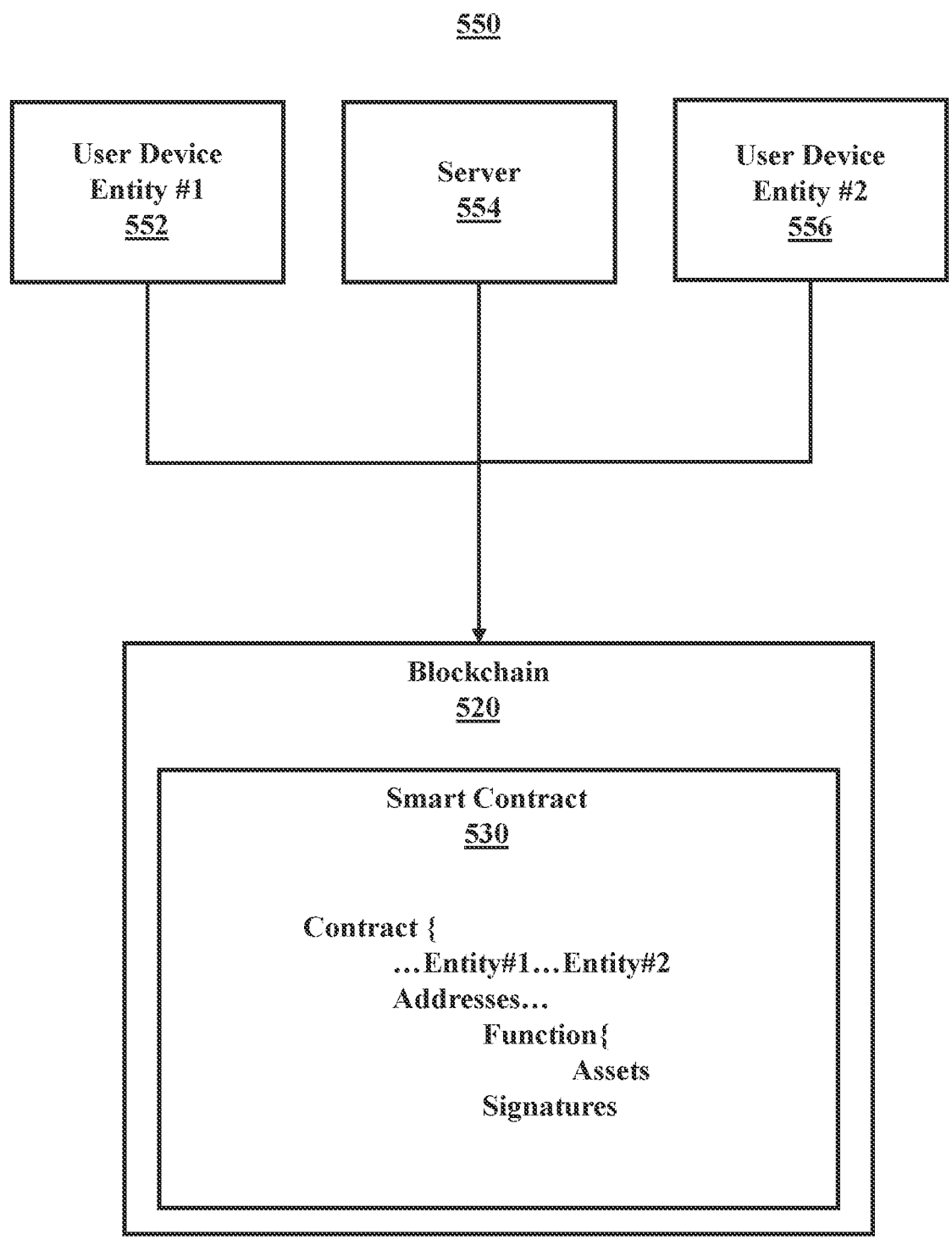
FIG. 5C illustrates a further example system configured to utilize a smart contract, in accordance with at least one embodiment of the present disclosure.

FIG. 5C illustrates an example system configured to utilize a smart contract configuration among contracting parties and a mediating server configured to enforce the smart contract terms on the blockchain in accordance with embodiments of the present disclosure. Referring to FIG. 5C, the configuration 550 may represent a communication session, an asset transfer session or a process or procedure that is driven by a smart contract 530 which explicitly identifies one or more user devices 552 and/or 556. The execution, operations and results of the smart contract execution may be managed by a server 554. Content of the smart contract 530 may require digital signatures by one or more of the entities 552 and 556 which are parties to the smart contract transaction. The results of the smart contract execution may be written to a blockchain 520 as a blockchain transaction. The smart contract 530 resides on the blockchain 520 which may reside on one or more computers, servers, processors, memories, and/or wireless communication devices.

Figure 5D:
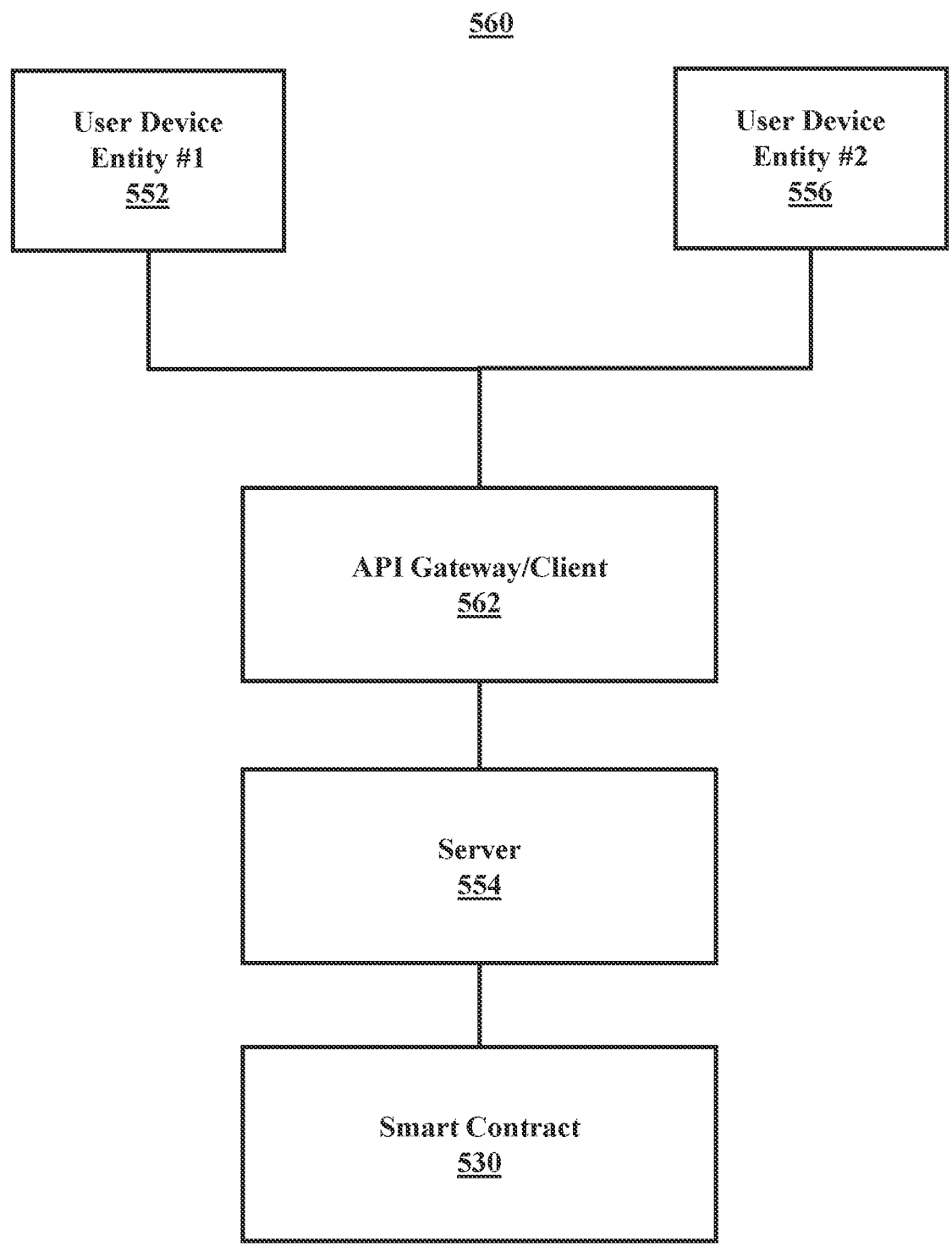
FIG. 5D illustrates yet another example system configured to utilize a blockchain, in accordance with at least one embodiment of the present disclosure.

FIG. 5D illustrates a system 560 including a blockchain, in accordance with embodiments of the present disclosure. Referring to the example of FIG. 5D, an application programming interface (API) gateway 562 provides a common interface for accessing blockchain logic (e.g., smart contract 530 or other chaincode) and data (e.g., distributed ledger, etc.). In this example, the API gateway 562 is a common interface for performing transactions (e.g., invoke, queries, etc.) on the blockchain by connecting one or more entities 552 and 556 to a blockchain peer (e.g., server 554). Here, the server 554 is a blockchain network peer component that holds a copy of the world state and a distributed ledger allowing clients 552 and 556 to query data on the world state as well as submit transactions into the blockchain network where, depending on the smart contract 530 and license terms, authorized transactions will run the smart contract 530.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 6A:
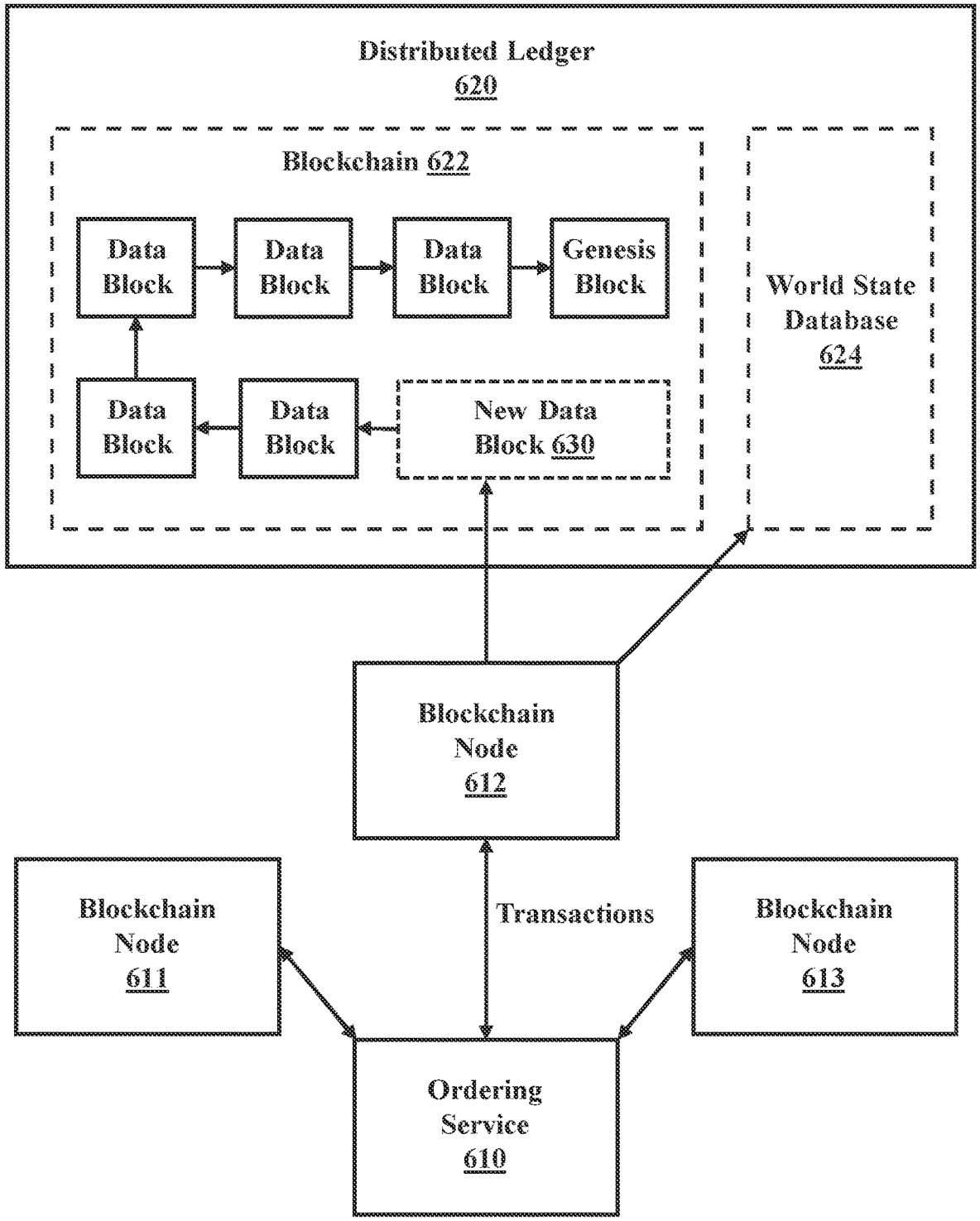
FIG. 6A illustrates a process for a new block being added to a distributed ledger, in accordance with at least one embodiment of the present disclosure.

FIG. 6A illustrates a process 600 of a new block being added to a distributed ledger 620, in accordance with embodiments of the present disclosure (e.g., when a new smart contract is generated, etc.), and FIG. 6A illustrates contents of a new data block structure 630 for blockchain, in accordance with embodiments of the present disclosure. The new data block 630 may contain document linking data.

Referring to FIG. 6A, clients (not shown) may submit transactions to blockchain nodes 611, 612, and/or 613. Clients may be instructions received from any source to enact activity on the blockchain 622. As an example, clients may be applications that act on behalf of a requester, such as a device, person or entity to propose transactions for the blockchain. The plurality of blockchain peers (e.g., blockchain nodes 611, 612, and/or 613) may maintain a state of the blockchain network and a copy of the distributed ledger 620. Different types of blockchain nodes/peers may be present in the blockchain network including nodes which simulate and authorize transactions proposed by clients; recommending nodes which utilize natural language processing techniques and recommend entities to be automatically contracted with users; and committing peers which validate transactions and commit transactions to the distributed ledger 620. In this example, the blockchain nodes 611, 612, and/or 613 may perform the role of endorser node, committer node, recommender node, or all three.

The distributed ledger 620 includes a blockchain 622 which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 is a transaction log, structured as hash-linked blocks where each block contains a sequence of N transactions. Blocks may include various components such as shown in FIG. 6A. The linking of the blocks (shown by arrows in FIG. 6A) may be generated by adding a hash of a prior block's header within a block header of a current block. In this way, all transactions on the blockchain 622 are sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 620 may be stored in the state database 624. Here, the current state data represents the latest values for all keys ever included in the chain transaction log of the blockchain 622. Chaincode invocations execute transactions against the current state in the state database 624. To make these chaincode interactions extremely efficient, the latest values of all keys are stored in the state database 624. The state database 624 may include an indexed view into the transaction log of the blockchain 622, it can therefore be regenerated from the chain at any time. The state database 624 may automatically get recovered (or generated if needed) upon peer startup, before transactions are accepted.

Nodes receive transactions from clients and authorize the transaction based on simulated results. Nodes hold smart contracts which simulate the transaction proposals. When a node authorizes a transaction, the node creates a transaction endorsement which is a signed response from the node to the client application indicating the authorization transaction. The method of securing a digital asset which may be specified within chaincode. Different channels may have different licensing terms. Authorized transactions are forward by the client application to ordering service 610.

The ordering service 610 accepts authorized transactions, orders them into a block, and delivers the blocks to the committing peers. For example, the ordering service 610 may initiate a new block when a threshold of transactions has been reached, a timer times out, or another condition. In the example of FIG. 6A, blockchain node 612 is a committing peer that has received a new data block 630 for storage on blockchain 622. The first block in the blockchain may be referred to as a genesis block which includes information about the blockchain, its members, the data stored therein, etc.

The ordering service 610 may be made up of a cluster of orderers. The ordering service 610 does not process transactions, smart contracts, or maintain the shared ledger. Rather, the ordering service 610 may accept the authorized transactions and specifies the order in which those transactions are committed to the distributed ledger 620. The architecture of the blockchain network may be designed such that the specific implementation of 'ordering' becomes a pluggable component.

Transactions are written to the distributed ledger 620 in a consistent order. The order of transactions is established to ensure that the updates to the state database 624 are valid when they are committed to the network. Unlike a cryptocurrency blockchain system where ordering occurs through the solving of a cryptographic puzzle, or mining, in this example the parties of the distributed ledger 620 may choose the ordering mechanism that best suits that network.

When the ordering service 610 initializes a new data block 630, the new data block 630 may be broadcast to committing peers (e.g., blockchain nodes 611, 612, and 613). When the transaction is authorized, the transaction is written to the blockchain 622 on the distributed ledger 620, and the state database 624 is updated with the write data from the read-write set. If a transaction fails, that is, if the committing peer finds that the read-write set does not match the current world state in the state database 624, the transaction ordered into a block will still be included in that block, but it will be marked as invalid, and the state database 624 will not be updated.

Figure 6B:
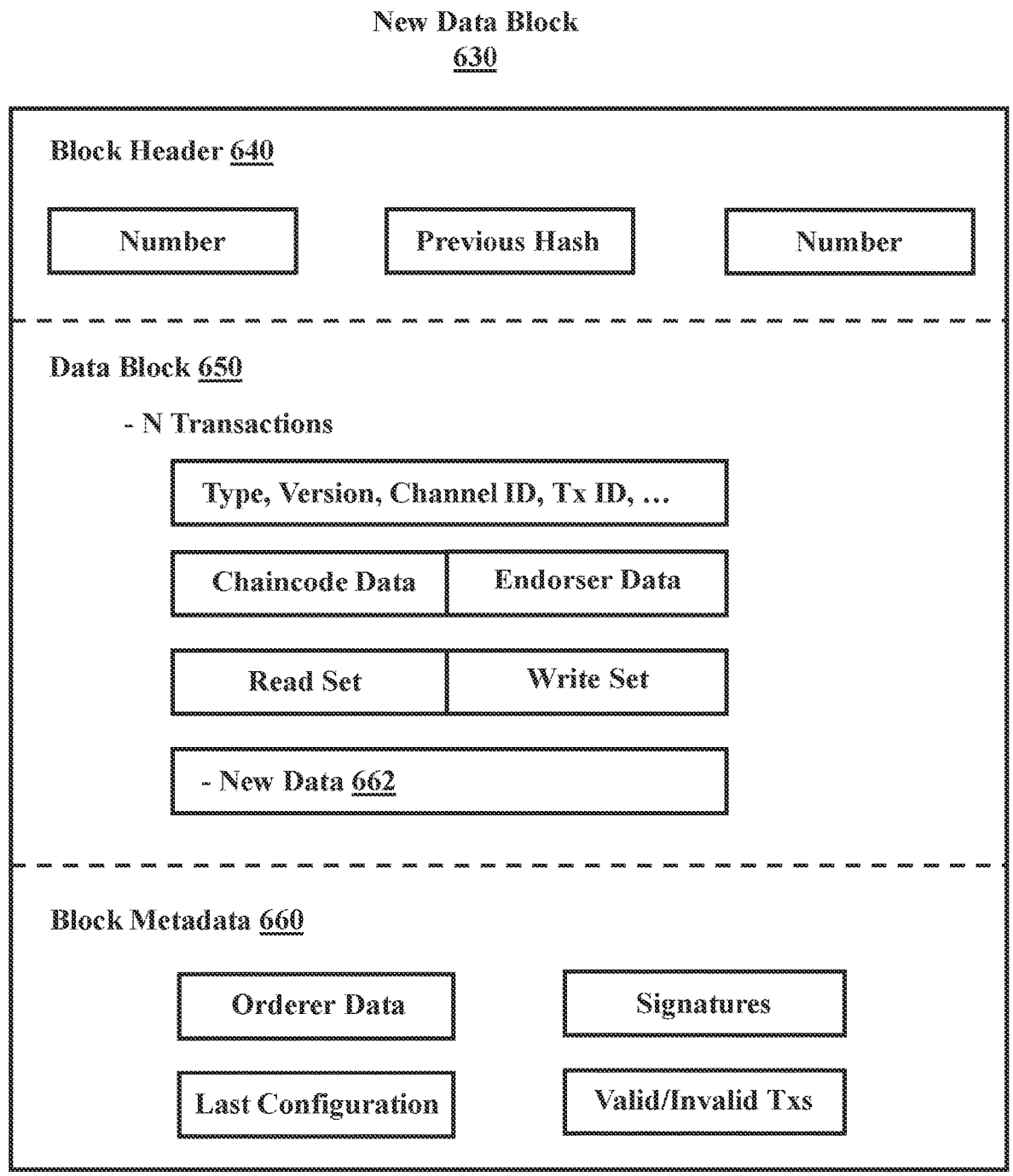
FIG. 6B illustrates contents of a new data block, in accordance with at least one embodiment of the present disclosure.

Referring to FIG. 6B, a new data block 630 (also referred to as a data block) that is stored on the blockchain 622 of the distributed ledger 620 may include multiple data segments such as a block header 640, block data 650, and block metadata 660. It should be appreciated that the various depicted blocks and their contents, such as new data block 630 and its contents shown in FIG. 6B are merely examples and are not meant to limit the scope of the example embodiments. The new data block 630 may store transactional information of N transaction(s) (e.g., 1, 10, 100, 500, 1000, 2000, 3000, etc.) within the data block 650. The new data block 630 may also include a link to a previous block (e.g., on the blockchain 622 in FIG. 6A) within the block header 640. In particular, the block header 640 may include a hash of a previous block's header. The block header 640 may also include a unique block number, a hash of the block data 650 of the new data block 630, and the like. The block number of the new data block 630 may be unique and assigned in various orders, such as an incremental/sequential order starting from zero.

The data block 650 may store transactional information of each transaction that is recorded within the new data block 630. For example, the transaction data may include one or more of a type of the transaction, a version, a timestamp, a channel ID of the distributed ledger 620, a transaction ID, an epoch, a payload visibility, a chaincode path (deploy tx), a chaincode name, a chaincode version, input (chaincode and functions), a client (creator) identify such as a public key and certificate, a signature of the client, signature of licensor, identities of licensors, a proposal hash, chaincode events, response status, namespace, a read set (list of key and version read by the transaction, etc.), a write set (list of key and value, etc.), a start key, an end key, a list of keys, a Merkle tree query summary, and the like. The transaction data may be stored for each of the N transactions.

In some embodiments, the data block 650 may also store new data 662 which adds additional information to the hash-linked chain of blocks in the blockchain 622. The additional information includes one or more of the steps, features, processes and/or actions described or depicted herein. Accordingly, the new data 662 can be stored in an immutable log of blocks on the distributed ledger 620. Some of the benefits of storing such new data 662 are reflected in the various embodiments disclosed and depicted herein. Although in FIG. 6B the new data 662 is depicted in the data block 650 but could also be located in the block header 640 or the block metadata 660. The new data 662 may include a document composite key that is used for linking the documents within an organization.

The block metadata 660 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the ordered metadata may be added by the ordering service 610. Meanwhile, a committer of the block (such as blockchain node 612) may add validity/invalidity information based on an endorsement policy, verification of read/write sets, and the like. The transaction filter may include a byte array of a size equal to the number of transactions in the data block 650 and a validation code identifying whether a transaction was valid/invalid.

Figure 6C:
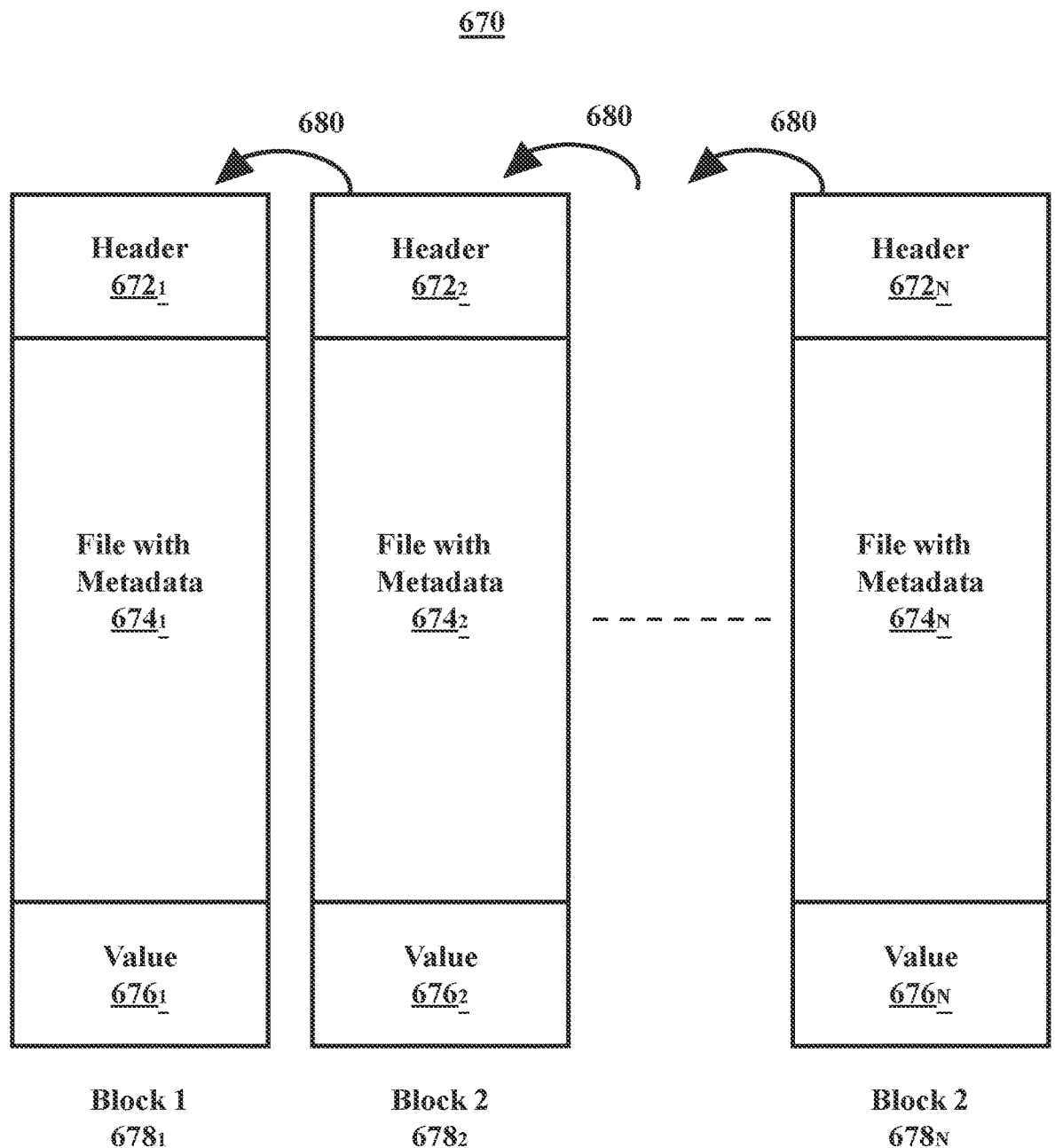
FIG. 6C illustrates a blockchain for digital content, in accordance with at least one embodiment of the present disclosure.

FIG. 6C illustrates an embodiment of a blockchain 670 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken into consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 6C, the blockchain 670 includes a number of blocks 6781, 6782, . . . 678N cryptographically linked in an ordered sequence, where N≥1. The encryption used to link the blocks 6781, 6782, . . . 678N may be any of a number of keyed or un-keyed Hash functions. In one embodiment, the blocks 6781, 6782, . . . 678N are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks 6781, 6782, . . . , 678N may be cryptographically linked by a function that is different from a hash function. For purposes of illustration, the following description is made with reference to a hash function, e.g., SHA-2.

Each of the blocks 6781, 6782, . . . , 678N in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block 6781 in the blockchain is referred to as the genesis block and includes the header 6721, original file 6741, and an initial value 6761. The hashing scheme used for the genesis block, and indeed in all subsequent blocks, may vary. For example, all the information in the first block 6781 may be hashed together and at one time, or each or a portion of the information in the first block 6781 may be separately hashed and then a hash of the separately hashed portions may be performed.

The header 6721 may include one or more initial parameters, which, for example, may include a version number, timestamp, nonce, root information, difficulty level, consensus protocol, duration, media format, source, descriptive keywords, and/or other information associated with original file 6741 and/or the blockchain. The header 6721 may be generated automatically (e.g., by blockchain network managing software) or manually by a blockchain participant.

Unlike the header in other blocks 6782 to 678N in the blockchain, the header 6721 in the genesis block does not reference a previous block, simply because there is no previous block.

The original file 6741 in the genesis block may be, for example, data as captured by a device with or without processing prior to its inclusion in the blockchain. The original file 6741 is received through the interface of the system from the device, media source, or node. The original file 6741 is associated with metadata, which, for example, may be generated by a user, the device, and/or the system processor, either manually or automatically. The metadata may be included in the first block 6781 in association with the original file 6741.

The value 6761 in the genesis block is an initial value generated based on one or more unique attributes of the original file 6741. In one embodiment, the one or more unique attributes may include the hash value for the original file 6741, metadata for the original file 6741, and other information associated with the file. In one implementation, the initial value 6761 may be based on the following unique attributes: 1) SHA-2 computed hash value for the original file; 2) originating device ID; 3) starting timestamp for the original file; 4) initial storage location of the original file; and 5) blockchain network member ID for software to currently control the original file and associated metadata.

The other blocks 6782 to 678N in the blockchain also have headers, files, and values. However, unlike the first block 6721, each of the headers 6722 to 672N in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 680, to establish an auditable and immutable chain-of-custody.

Each of the header 6722 to 672N in the other blocks may also include other information, e.g., version number, timestamp, nonce, root information, difficulty level, consensus protocol, and/or other parameters or information associated with the corresponding files and/or the blockchain in general.

The files 6742 to 674N in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks 6762 to 676N in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)

b) new storage location for the file c) new metadata identified associated with the file d) transfer of access or control of the file from one blockchain participant to another blockchain participant FIG. 6D illustrates an embodiment of a block which may represent the structure of the blocks in the blockchain 690 in accordance with one embodiment. The block, $Block_i$, includes a header $672_i$, a file $674_i$, and a value $676_i$.

The header $672_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $674_i$ includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use as digital evidence, for example, as described in connection with an embodiment discussed below. In addition to the metadata, each data may be tagged with reference REF 1, REF 2 . . . . , REFN to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $676_i$ is a hash value or other value computed based on any of the types of information previously discussed. For example, for any given block $Block_j$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 690 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

What is claimed is:

1. A computer-implemented method for automatically and digitally securing an asset, the computer-implemented method comprising:
   hashing, by a server, a secret preimage to produce a secret hash, wherein the server is interconnected with each of a first blockchain network and a second blockchain network;
   locking, by the server, a digital collateral asset with the secret hash for a first predetermined period of time;
   transferring, by the server, first information associated with the locked digital collateral asset to the first blockchain network;
   locking, by the server, a digital loan asset with the secret hash for a second predetermined period of time, wherein the second predetermined period of time is less than the first predetermined period of time;
   transferring, by the server, second information associated with the locked digital loan asset to the second blockchain network;
   pledging, by the server, on the second blockchain network, a digital loan repayment up to an amount of time of the first predetermined period of time plus the second predetermined period of time, wherein
      the second blockchain network is associated with a smart contract,
      the smart contract comprises executable code associated with transactions on the second blockchain network,
      the smart contract is executed based on the pledging and one or more conditions associated with the digital loan repayment, and
      a first state of the second blockchain network is modified to a second state based on the execution of the smart contract;
   fetching, by the server from the second blockchain network, using a cross-network data sharing protocol, the pledge for the digital loan repayment, wherein the pledge is fetched to authenticate the digital loan repayment; and
   automatically and immediately unlocking, by the server, the locked digital collateral asset before the amount of time of the first predetermined period of time plus the second predetermined period of time expires for a borrower of the digital loan asset, wherein the locked digital collateral asset is unlocked based on the fetched pledge for the digital loan repayment and the modified second state of the second blockchain network.

2. The computer-implemented method of claim 1, further comprising:
   transmitting, by the server, the secret preimage before the first predetermined period of time expires, wherein the secret preimage is transmitted to the second blockchain network; and
   claiming, by the server, the locked digital loan asset based on the transmitting of the secret preimage.

3. The computer-implemented method of claim 1, further comprising:
   supplying, by the server, the secret preimage to the first blockchain network, wherein the secret preimage is supplied to the first blockchain network to claim the locked digital collateral asset; and
   pledging, by the server, the locked digital collateral asset before the second predetermined period of time expires, wherein the locked digital collateral asset is pledged based on the supplying of the secret preimage.

4. The computer-implemented method of claim 3, further comprising:
   supplying, by the server, the pledge of the digital loan repayment to the first blockchain network, wherein the pledge of the digital loan repayment is supplied based on the pledging of the digital loan repayment up to the amount of time of the first predetermined period of time plus the second predetermined period of time;
   claiming, by the server, the pledged digital collateral asset before the amount of time of the first predetermined period of time lapses, wherein the pledged digital collateral asset is claimed based on the supplying of the pledge of the digital loan repayment;
   receiving, by the server, the claim on the pledged digital collateral asset from the first blockchain network;
   transmitting, by the server, the received claim on the pledged digital collateral asset before the amount of time of the first predetermined period of time plus the second predetermined period of time lapses, wherein the received claim on the pledged digital collateral asset is transmitted to the second blockchain network; and claiming, by the server, the pledged digital loan repayment based on the transmitting of the received claim on the pledged digital collateral asset.

5. The computer-implemented method of claim 1, wherein
the pledge of the digital loan repayment is a proof of the digital loan repayment, and
the locked digital collateral asset is unlocked, by the server, using the second blockchain network.

6. The computer-implemented method of claim 4, further comprising increasing, by the server, the amount of time of the first predetermined period of time, wherein a lender has to supply a claim on the pledged digital collateral asset before the amount of time of the increased first predetermined period of time expires.

7. The computer-implemented method of claim 1, further comprising receiving, by the server, the unlocked digital collateral asset from the first blockchain network based on the pledging of the digital loan repayment on the second blockchain network.

8. A computer program product for automatically and digitally securing an asset, the computer program product comprising:
one or more computer readable storage media; and
program instructions stored on the one or more computer readable storage media, the program instructions executable by one or more computer processors to cause the one or more computer processors to:
hash a secret preimage to produce a secret hash, wherein the one or more computer processors is interconnected with each of a first blockchain network and a second blockchain network;
lock a digital collateral asset with the secret hash for a first predetermined period of time;
transfer first information associated with the locked digital collateral asset to the first blockchain network;
lock a digital loan asset with the secret hash for a second predetermined period of time, wherein the second predetermined period of time is less than the first predetermined period of time;
transfer second information associated with the locked digital loan asset to the second blockchain network;
pledge, on the second blockchain network, a digital loan repayment up to an amount of time of the first predetermined period of time plus the second predetermined period of time, wherein
the second blockchain network is associated with a smart contract,
the smart contract comprises executable code associated with transactions on the second blockchain network,
the smart contract is executed based on the pledging and one or more conditions associated with the digital loan repayment, and
a first state of the second blockchain network is modified to a second state based on the execution of the smart contract;
fetch from the second blockchain network, using a cross-network data sharing protocol, the pledge for the digital loan repayment, wherein the pledge is fetched to authenticate the digital loan repayment; and
automatically and immediately unlock the locked digital collateral asset before the amount of time of the first predetermined period of time plus the second predetermined period of time expires for a borrower of the digital loan asset, wherein the locked digital collateral asset is unlocked based on the fetched pledge for the digital loan repayment and the modified second state of the second blockchain network.

9. The computer program product of claim 8, wherein the program instructions further cause the one or more computer processors to:
transmit the secret preimage before the first predetermined period of time expires, wherein the secret preimage is transmitted to the second blockchain network; and
claim the locked digital loan asset based on the transmitted secret preimage.

10. The computer program product of claim 8, wherein the program instructions further cause the one or more computer processors to:
supply the secret preimage to the first blockchain network, wherein the secret preimage is supplied to the first blockchain network to claim the locked digital collateral asset; and
pledge the locked digital collateral asset before the second predetermined period of time expires, wherein the locked digital collateral asset is pledged based on the supply of the secret preimage.

11. The computer program product of claim 10, wherein the program instructions further cause the one or more computer processors to:
supply the pledge of the digital loan repayment to the first blockchain network, wherein the pledge of the digital loan repayment is supplied based on the pledge of the digital loan repayment up to the amount of time of the first predetermined period of time plus the second predetermined period of time;
claim the pledged digital collateral asset before the amount of time of the first predetermined period of time lapses, wherein the pledged digital collateral asset is claimed based on the supply of the pledge of the digital loan repayment;
receive the claim on the pledged digital collateral asset from the first blockchain network;
transmit the received claim on the pledged digital collateral asset before the amount of time of the first predetermined period of time plus the second predetermined period of time lapses, wherein the received claim on the pledged digital collateral asset is transmitted to the second blockchain network; and
claim the pledged digital loan repayment based on the transmission of the received claim on the pledged digital collateral asset.

12. The computer program product of claim 8, wherein
the pledge of the digital loan repayment is a proof of the digital loan repayment, and
the locked digital collateral asset is unlocked using the second blockchain network.

13. The computer program product of claim 11, wherein the program instructions further cause the one or more computer processors to increase the amount of time of the first predetermined period of time, wherein a lender has to supply a claim on the pledged digital collateral asset before the amount of time of the increased first predetermined period of time expires.

14. The computer program product of claim 8, wherein the program instructions further cause the one or more computer processors to receive the unlocked digital collateral asset from the first blockchain network based on the pledge of the digital loan repayment on the second blockchain network.

15. A computer system for automatically and digitally securing an asset, the computer system comprising:
one or more computer processors;
one or more computer readable storage media; and
computer program instructions stored on the one or more computer readable storage media, the computer program instructions executable by the one or more computer processors to cause the one or more computer processors to:
  hash a secret preimage to produce a secret hash, wherein the computer system is interconnected with each of a first blockchain network and a second blockchain network;
  lock a digital collateral asset with the secret hash for a first predetermined period of time;
  transfer first information associated with the locked digital collateral asset to the first blockchain network;
  lock a digital loan asset with the secret hash for a second predetermined period of time, wherein the second predetermined period of time is less than the first predetermined period of time;
  transfer second information associated with the locked digital loan asset to the second blockchain network;
  pledge, on the second blockchain network, a digital loan repayment up to an amount of time of the first predetermined period of time plus the second predetermined period of time, wherein
    the second blockchain network is associated with a smart contract,
    the smart contract comprises executable code associated with transactions on the second blockchain network,
    the smart contract is executed based on the pledge and one or more conditions associated with the digital loan repayment, and
    a first state of the second blockchain network is modified to a second state based on the execution of the smart contract;
  fetch, from the second blockchain network, using a cross-network data sharing protocol, the pledge for the digital loan repayment, wherein the pledge is fetched to authenticate the digital loan repayment; and
  automatically and immediately unlock the locked digital collateral asset before the amount of time of the first predetermined period of time plus the second predetermined period of time expires for a borrower of the digital loan asset, wherein the locked digital collateral asset is unlocked based on the fetched pledge for the digital loan repayment and the modified second state of the second blockchain network.

16. The computer system of claim 15, wherein the computer program instructions further cause the one or more computer processors to:
  transmit the secret preimage before the first predetermined period of time expires, wherein the secret preimage is transmitted to the second blockchain network; and
  claim the locked digital loan asset based on the transmitted secret preimage.

17. The computer system of claim 15, wherein the computer program instructions further cause the one or more computer processors to:
  supply the secret preimage to the first blockchain network, wherein the secret preimage is supplied to the first blockchain network to claim the locked digital collateral asset; and
  pledge the locked digital collateral asset before the second predetermined period of time expires, wherein the locked digital collateral asset is pledged based on the supply of the secret preimage.

18. The computer system of claim 17, wherein the computer program instructions further cause the one or more computer processors to:
  supply the pledge of the digital loan repayment to the first blockchain network, wherein the pledge of the digital loan repayment is supplied based on the pledge of the digital loan repayment up to the amount of time of the first predetermined period of time plus the second predetermined period of time;
  claim the pledged digital collateral asset before the amount of time of the first predetermined period of time lapses, wherein the pledged digital collateral asset is claimed based on the supply of the pledge of the digital loan repayment;
  receive the claim on the pledged digital collateral asset from the first blockchain network;
  transmit the received claim on the pledged digital collateral asset before the amount of time of the first predetermined period of time plus the second predetermined period of time lapses, wherein the received claim on the pledged digital collateral asset is transmitted to the second blockchain network; and
  claim the pledged digital loan repayment based on the transmission of the received claim on the pledged digital collateral asset.

19. The computer system of claim 15, wherein
  the pledge of the digital loan repayment is a proof of the digital loan repayment, and
  the locked digital collateral asset is unlocked using the second blockchain network.

20. The computer system of claim 18, wherein the computer program instructions further cause the one or more computer processors to increase the amount of time of the first predetermined period of time, wherein a lender has to supply a claim on the pledged digital collateral asset before the amount of time of the increased first predetermined period of time expires.

* * * * *